(12) United States Patent
Kakinami

(10) Patent No.: US 7,822,571 B2
(45) Date of Patent: Oct. 26, 2010

(54) CALIBRATION DEVICE AND CALIBRATION METHOD FOR RANGE IMAGE SENSOR

(75) Inventor: Toshiaki Kakinami, Nagoya (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 10 days.

(21) Appl. No.: 12/389,025

(22) Filed: Feb. 19, 2009

(65) Prior Publication Data

US 2009/0222229 A1   Sep. 3, 2009

(30) Foreign Application Priority Data

Feb. 28, 2008   (JP)   ............................. 2008-048548

(51) Int. Cl.
  *G01C 25/00* (2006.01)
(52) U.S. Cl. ...................................... 702/104
(58) Field of Classification Search .................. 702/104
  See application file for complete search history.

(56) References Cited

U.S. PATENT DOCUMENTS

| 6,396,495 | B1 * | 5/2002 | Parghi et al. ................. 345/426 |
| 2006/0227041 | A1 | 10/2006 | Okamoto | |
| 2006/0290920 | A1 | 12/2006 | Kampchen et al. | |

FOREIGN PATENT DOCUMENTS

| JP | 8-313212 A | 11/1996 |
| JP | 10-47920 A | 2/1998 |
| JP | 2002-46087 A | 2/2002 |
| JP | 2003-259357 A | 9/2003 |
| JP | 2007-26073 A | 2/2007 |

* cited by examiner

*Primary Examiner*—Tung S Lau
(74) *Attorney, Agent, or Firm*—Sughrue Mion, PLLC

(57) ABSTRACT

A calibration device for calibrating a range image sensor, detecting a distance of each direction within a detection range and generating a range image data, in a state where the range image sensor is attached at a mobile body, the calibration device includes a data receiving portion for receiving a calibration-subject data including a calibration target, which is set within the detection range and includes a first plane surface and a second plane surface, from the range image sensor, a plane surface specifying portion for specifying each of the first and second plane surfaces in a three-dimensional reference coordinate system, a normal vector calculating portion for three-dimensionally calculating a normal vector of each of the first and second plane surfaces, and a rotation calculating portion for three-dimensionally calculating a rotation of the range image sensor on the basis of an already-recognized posture information and the normal vector.

11 Claims, 8 Drawing Sheets

US 7,822,571 B2

CALIBRATION DEVICE AND CALIBRATION METHOD FOR RANGE IMAGE SENSOR

CROSS REFERENCE TO RELATED APPLICATIONS

This application is based on and claims priority under 35 U.S.C. §119 to Japanese Patent Application 2008-048548, filed on Feb. 28, 2008, the entire contents of which is incorporated herein by reference.

FIELD OF THE INVENTION

The present invention relates to a calibration device and a calibration method for calibrating a range image sensor in a state where the range image sensor is attached to a mobile body.

BACKGROUND

Various devices and methods are provided for assisting a driver by detecting surroundings of a vehicle in order to improve safety and operability of the vehicle. In order to assist the driver in the above-described way, various sensors such as a grayscale image sensor, a range image sensor and the like, which detect a visual image and three-dimensional information around the vehicle, are provided at the vehicle. Additionally, above-mentioned sensors, which function as human eyes, are used for robots. In a case where the above-mentioned sensors are provided to a mobile body such as the vehicle, the robots and the like, in order to recognize three-dimensional characteristics of the surroundings while the mobile body is moving, a sensor position and a sensor posture relative to a coordinate system, in which the mobile body is set as a reference, may preferably be accurately calibrated. The range image sensor, which detects the three-dimensional circumstances, is often used as a sensor for detecting surroundings of the mobile body. Therefore, calibration of high accuracy is required for such range image sensors.

A method of calibrating a three-dimensional measuring device, is as an example of the range image sensor, is disclosed in JP10-47920A. According to the method of calibrating the three-dimensional measuring device disclosed in JP 10-47920A, a measurement plate, which serves as a subject of calibration, is moved relative to the three-dimensional measuring device. More specifically, the measurement plate is moved so as to rotate in a yaw direction, so as to rotate in a pitching direction, and so as to move forward and backward. The three-dimensional measuring device obtains a range image at each moving point. Then, a three-dimensional coordinate value is calculated on the basis of a range image value of each pixel (picture element), so that a calibration value is obtained from the three-dimensional coordinate value.

However, in the method of calibrating the three-dimensional measuring device disclosed in JP 10-47920A, the measurement plate needs to be moved. Accordingly, accuracy for moving the measurement plate may affect calibration accuracy. In order to improve the accuracy for moving the measurement plate, a moving means for the measurement plate needs to be carefully controlled, which may result in increasing a calibration system in size. Further, time necessary for calibration also becomes longer. In a case where an automobile is adapted as the moving body, it is not preferable to extend time for a calibration process in a production line in perspective of production efficiency. Further, the method disclosed in JP 10-47920A is a method of calibrating the single three-dimensional measuring device, and is not a method of calibrating the three-dimensional measuring device in a state where the three-dimensional measuring device is mounted on the mobile body. Even if the three-dimensional measuring device (the range image sensor) itself is calibrated with high accuracy, the coordinate system of the range image sensor may be displaced relative to the reference coordinate system of the mobile body when the three-dimensional measuring device is provided to the mobile body. Hence, the calibration of the range image sensor may preferably be executed in the state where the range image sensor is mounted on the mobile body.

A need thus exists to provide a calibration device and a calibration method for a range image sensor, which are not susceptible to the drawback mentioned above.

SUMMARY OF THE INVENTION

According to an aspect of the present invention, a calibration device for a range image sensor, the calibration device being configured so as to calibrate the range image sensor, which is attached at a mobile body, detects a distance of each direction within a detection range and generates a range image data from the detected distance information, in a state where the range image sensor is attached at the mobile body, the calibration device includes a data receiving portion for receiving a calibration-subject data, which is the range image data including a calibration target, from the range image sensor, the calibration target being set within the detection range and is configured so as to include a first plane surface and a second plane surface, which differs from the first plane surface, a plane surface specifying portion for specifying each of the first plane surface and the second plane surface in a three-dimensional reference coordinate system on the basis of the calibration-subject data, a normal vector calculating portion for calculating a normal vector of each of the specified first and second plane surfaces in the three-dimensional reference coordinate system, and a rotation calculating portion for calculating a rotation of the range image sensor in the three-dimensional reference coordinate system on the basis of a posture information, which has already been recognized, and the normal vector in the three-dimensional coordinate system.

According to another aspect of the invention, a calibration method for a range image sensor, the calibration method calibrating the range image sensor, which is attached at a mobile body, detects a distance of each direction within a detection range and generates a range image data from the detected distance information, in a state where the range image sensor is attached at the mobile body, the calibration method includes a mobile body setting process for setting the mobile body at a predetermined position in a three-dimensional reference coordinate system in a stationary state, a calibration target setting process for setting a calibration target within the detection range in a state where a position information of the calibration target relative to the mobile body and a posture information of the calibration target is specified in the three-dimensional reference coordinate system, the calibration target being configured so as to include a first plane surface and a second plane surface, which differs from the first plane surface, a data receiving process for receiving a calibration-subject data from the range image sensor, the calibration-subject data being a range image data generated by the range image sensor in a state where the mobile body is in the stationary state at the predetermined position and including the calibration target, a plane surface specifying process for specifying each of the first and second plane surfaces in the three-dimensional reference coordinate system on the basis of the calibration-subject data, a normal vector calculating process for calculating a normal vector of each of the specified first and second plane surfaces in the three-dimensional reference coordinate system, and a rotation calculating process for calculating a rotation of the range image sensor in the three-dimensional reference coordinate system on the basis of the posture information of the calibration target and the normal vector of each of the specified first and second plane surfaces in the three-dimensional reference coordinate system.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

First Embodiment

A first embodiment of a calibration device and a calibration method for a range image sensor will be described below in accordance with the attached drawings. More specifically, the calibration device and the calibration method for the range image sensor, which is attached at a mobile body and which detects distance of each direction within a detection range and generates two-dimensional range image data, will be described below. The range image sensor is a sensor that measures distance of each direction within a predetermined field of vision with an origin of a predetermined reference coordinate system as a reference. In other words, while a conventional image sensor generates two-dimensional data as a grayscale image, in which each pixel (picture element) includes an intensity value and the like, the range image sensor generates two-dimensional data as a range image, in which each pixel includes a distance value (range image data). In other words, the range image sensor generates the two-dimensional data, in which each pixel of a two-dimensional image plane includes depth information instead of the intensity value. As each pixel includes direction and distance from the origin of the reference coordinate as information, a group of vector quantities from the origin of the reference coordinate is regarded as the range image data.

For example, a scan-type laser radar, which is a type of a point sensor, is one example of an active-type range image sensor. The scan-type laser radar obtains the distance information of each pixel by scanning the detection range and generates the two-dimensional range image data. Further, a stereo image processing device, generating the range image by obtaining the distance information by stereo-image processing the grayscale image, which is obtained by means of a charge coupled device (CCD), CMOS image sensor (CIS) and the like, is an example of a passive-type range image sensor. Additionally, a sensor, which includes a light source such as a near infra-red projection light emitting diode (a near infra-red projection LED) and the like, and sensitivity against the near infra-red, and which is capable of measuring a time for an illuminated light to return for each pixel, is another example of the active-type range image sensor.

Figure 1:
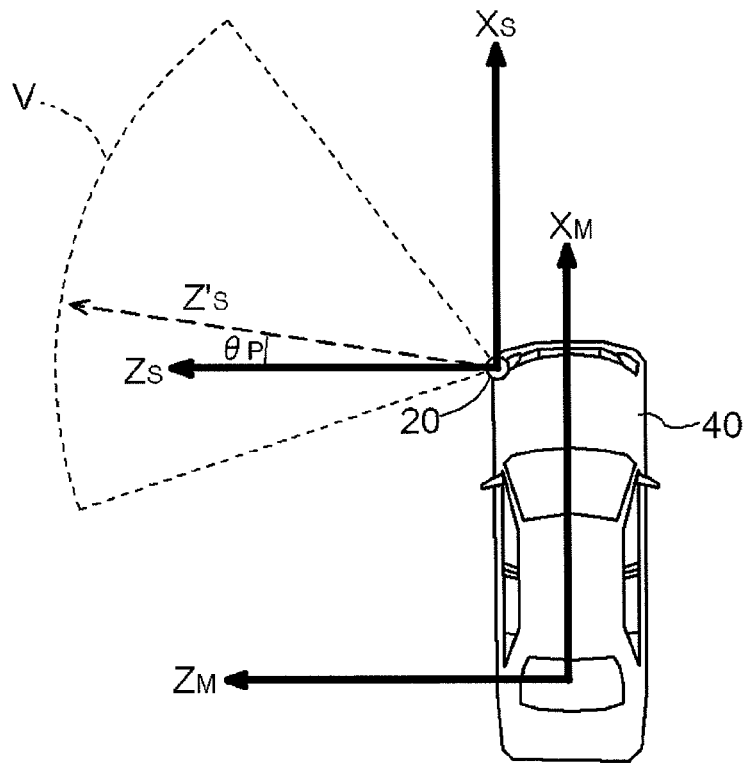
FIG. 1 is a diagram for explaining a rotational displacement between a mobile body and a range image sensor.

Illustrated in FIG. 1 is a diagram for explaining a rotational displacement between a vehicle 40, which serves as the mobile body, and a range image sensor 20, which is provided at the vehicle 40. In FIG. 1, an $X_M$ axis and a $Z_M$ axis represent coordinate axes in a three-dimensional Cartesian coordinate system, in which the vehicle 40 is set as a reference. A $Y_M$ axis extends in a direction vertical to a paper surface of FIG. 1 towards a near side of a reader. An $X_S$ axis and a $Z_S$ axis represent coordinate axes in a three-dimensional Cartesian coordinate system, in which the range image sensor 20 is set as a reference. A $Y_S$ axis extends in the direction vertical to the paper surface of FIG. 1 towards the near side of the reader. The $Z_S$ axis of the three-dimensional Cartesian coordinate system, in which the range image sensor 20 is set as the reference, serves as a principal axis corresponding to an optical center in the image sensor. Additionally, the $Z_M$ axis in the coordinate system, in which the vehicle 40 is set as the reference, is often defined so as to extend opposite from the direction illustrated in FIG. 1 by 180 degrees (i.e. the $Z_M$ axis often defined so as to extend towards the right side in FIG. 1). However, in this embodiment, the $Z_M$ axis is described so as to extend in the same direction as the $Z_S$ axis of the coordinate system, in which the range image sensor 20 is set as the reference, in order to facilitate the explanation of the calibration device and the calibration method for the range image sensor 20. A code "V" represents a field of vision of the range image sensor 20, i.e. the detection range.

The range image sensor 20 is ideally provided at the vehicle 40 in a state where the $X_S$ axis extends in parallel with the $X_M$ axis, the $Y_S$ axis extends in parallel with the $Y_M$ axis and the $Z_S$ axis extends in parallel with the $Z_M$ axis. In reality, however, it is difficult to manage mechanical tolerance with high accuracy, and the axes extend in non-parallel manner with each other, thereby generating a displacement between the coordinate system of the range image sensor 20 and the coordinate system of the vehicle 40. Illustrated in FIG. 1 is a case where the principal axis $Z_S$ in the coordinate system of the range image sensor 20 is displaced to a position $Z'_S$ by $\theta_P$ in a clockwise direction. In FIG. 1, it may seem as if the principal axis $Z_S$ is rotated by $\theta_P$ in an $X_S$-$Z_S$ plane, i.e. it may seem as if the principal axis $Z_S$ is rotated by $\theta_P$ around the $Y_S$ axis as a rotational axis, because the three-dimensional system is described on the paper surface (two-dimension). In reality, however, the sensor 20 (the axes of the sensor 20) is three-dimensionally rotated by $\theta_P$ around all axes as rotational axes.

As is evident from FIG. 1, a displacement of a detection position in response to the rotational displacement increases as a detection subject is being distanced from the range image sensor 20. Accordingly, an error may also be generated in a coordinate value, which is specified on the basis of the range image data. In a case where the range image sensor 20 is mounted on the vehicle 40, the range image data is used for a drive assistance, a parking assistance and the like. In this case, it may be preferable if the error generated in the coordinate value is lessened. In reality, however, it is difficult to manage the mechanical tolerance with high accuracy, as described above. Hence, the range image data is adjusted by obtaining a posture of the range image sensor 20, i.e. information relating to rotations in the coordinate system, in the state where the range image sensor 20 is provided at the vehicle 40. In this embodiment, obtaining the information relating to the rotations in the coordinate systems is expressed as calibration of the range image sensor 20. As described below, a predetermined calibration target is used for the calibration of the range image sensor 20.

Figure 2:
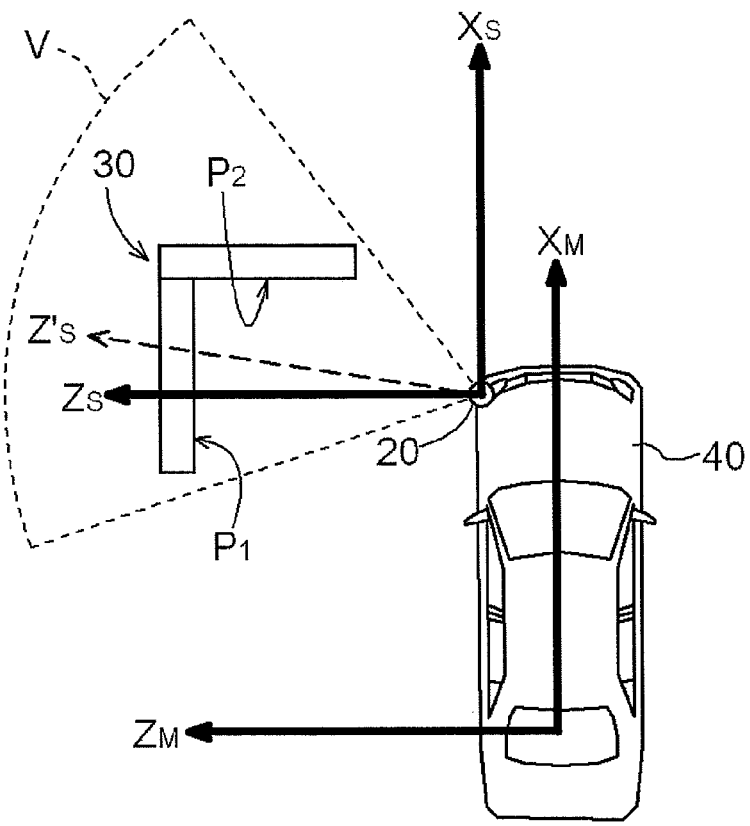
FIG. 2 is a diagram for explaining an arrangement example of a calibration target.

Illustrated in FIG. 2 is an example of arrangement of a calibration target 30. As illustrated in FIG. 2, the calibration target 30 is configured with a first plane surface $P_1$ and a second plane surface $P_2$, which differs from the first plane surface P1. The configuration of the calibration target 30 is not limited to the example illustrated in FIG. 2. A process of configuring the calibration target 30 as, for example, illustrated in FIG. 2 serves as a calibration target configuration process. In the calibration of the range image sensor 20, the vehicle 40, serving as the mobile body, is stationary positioned at a predetermined position in a three-dimensional reference coordinate system. This process serves as a mobile body setting process according to the present embodiment. The vehicle 40, serving as the mobile body, is positioned at the predetermined position within a range of relatively high mechanical tolerance by means of a wheel lock and the like. Any desired coordinate system is adaptable to the three-dimensional reference coordinate system. However, in this embodiment, the coordinate system $(X_M, Y_M, Z_M)$, in which the vehicle 40 is set as the reference, is adapted as the three-dimensional reference coordinate system.

The calibration target 30 is set within the detection range V of the range image sensor 20 in a state where the position information of the calibration target 30 relative to the vehicle 40, which is in a stationary state, and a posture information of the calibration target 30 has already been specified in the three-dimensional reference coordinate system. This process serves as a calibration target setting process according to the present embodiment. In a production plant, a maintenance facility and the like, the calibration target 30 is fixedly set, and the vehicle 40, which is a calibration subject, is stored in such plant, facility and the like. Hence, in reality, a position and a posture of the calibration target 30 are specified relative to a position at which the vehicle 40 is to be positioned in the stationary state, and the vehicle 40 is positioned with high accuracy relative to the position at which the vehicle 40 is to be positioned in the stationary state. Accordingly, the position and the posture of the vehicle 40 and the calibration target 30 are specified in the three-dimensional reference coordinate system $(X_M, Y_M, Z_M)$, in which the vehicle 40 is set as the reference.

Figure 3:
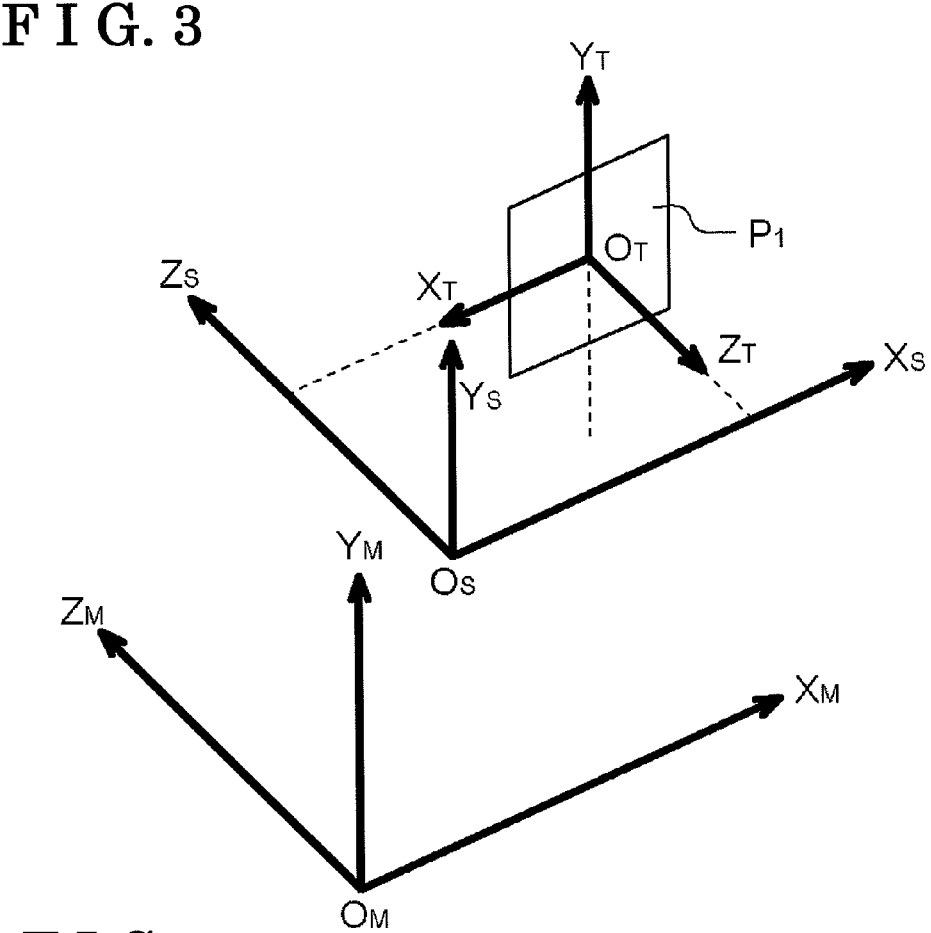
FIG. 3 is a diagram for explaining a relationship between coordinate systems of the mobile body, the range image sensor and the calibration target.

A relationship between the coordinate system, in which the vehicle 40 is set as the reference, the coordinate system, in which the calibration target 30 is set as the reference, and the coordinate system, in which the range image sensor 20 is set as the reference, will be described with reference to FIG. 3. In FIG. 3, a coordinate system $(X_T, Y_T, Z_T)$ represents a coordinate system in which the first plane surface $P_1$, which is one of the surfaces the calibration target 30 includes, is set as a reference. The first plate surface $P_1$ is set so as to be in parallel with an $X_M$-$Y_M$ plane of the coordinate system $(X_M, Y_M, Z_M)$, in which the vehicle 40 is set as the reference, serving as the three-dimensional reference coordinate system. A $Z_T$ axis of the coordinate system $(X_T, Y_T, Z_T)$, in which the first plane surface $P_1$ is set as the reference, and the $Z_M$ axis of the three-dimensional reference coordinate system $(X_M, Y_M, Z_M)$ are arranged so as to be in parallel with each other and so as to extend opposite from each other.

As described above, in the case where the range image sensor 20 is ideally set at the vehicle 40, the coordinate system $(X_S, Y_S, Z_S)$ of the range image sensor 20 and the three-dimensional reference coordinate system $(X_M, Y_M, Z_M)$ are arranged so as to be in parallel with each other and so as to extend in the same direction. Accordingly, it may be conceivable that the coordinate system $(X_S, Y_S, Z_S)$ of the range image sensor 20 is arranged at a position where the three-dimensional reference coordinate system $(X_M, Y_M, Z_M)$ is translated by a predetermined amount. Hence, the $Z_T$ axis of the coordinate system $(X_T, Y_T, Z_T)$, in which the first plane surface $P_1$ is set as the reference and the $Z_S$ axis of the coordinate system $(X_S, Y_S, Z_S)$ of the range image sensor 20 are arranged so as to be in parallel with each other and so as to extend opposite from each other.

However, as mentioned above, it is unconceivable that the coordinate system $(X_S, Y_S, Z_S)$ of the range image sensor 20 is arranged at the position where the three-dimensional reference coordinate system $(X_M, Y_M, Z_M)$ is translated by the predetermined amount, and an error is generated in a translation component and a rotational component. An influence of the error of the rotational component (i.e. the error in the posture) on the range image data is greater when comparing to an influence of the error of the translation component (i.e. the error in the position) on the range image data. Hence, the calibration device and the calibration method for calibrating the error of the rotational component will be described below.

Figure 4:
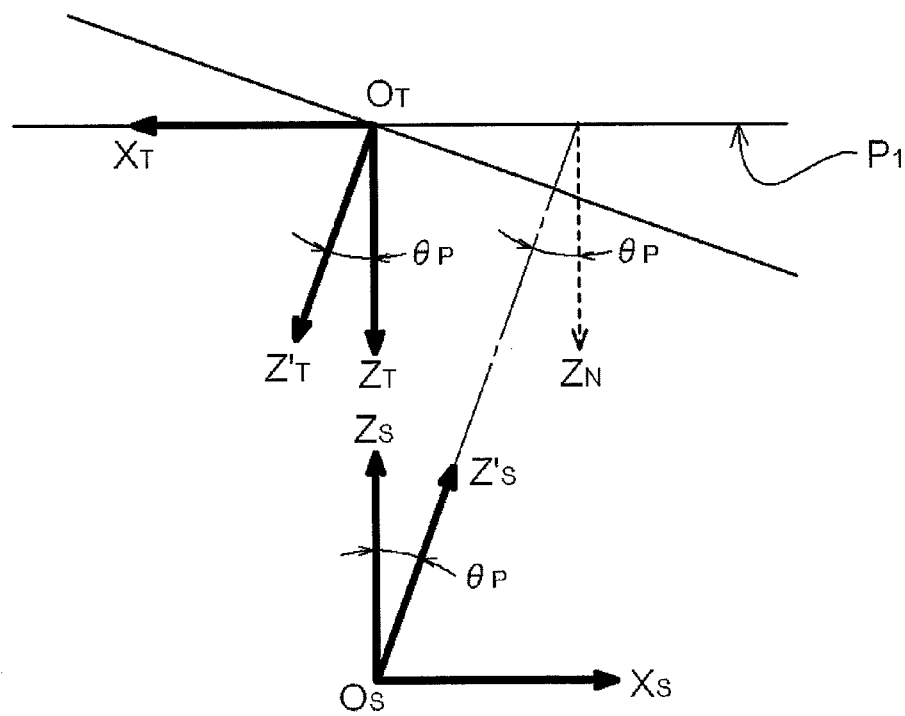
FIG. 4 is a diagram for explaining a rotation between the calibration target and the range image sensor.

Illustrated in FIG. 4 is a diagram for explaining a rotation between the calibration target 30 and the range image sensor 20. As the calibration target 30 and the vehicle 40 are set under a condition where any errors are not generated in the rotational component, the rotation between the calibration target 30 and the range image sensor 20 is equivalent to a rotation between the vehicle 40 and the range image sensor 20.

A case where the range image sensor 20 does not include the error in the rotational component in FIG. 4 will be considered below. As the first plane surface $P_1$ of the calibration target 30 is arranged so as to be in parallel with the $X_M$-$Y_M$ plane of the three-dimensional reference coordinate system, the $Z_T$ axis of the coordinate system, in which the first plane surface $P_1$ is set as the reference, and the $Z_S$ axis of the coordinate system of the range image sensor 20, which serves as the principal axis of the range image sensor 20, are arranged so as to be in parallel with each other and so as to extend opposite from each other.

In a case where the range image sensor 20 is rotated around the $Y_S$ axis and the principal axis $Z_S$ is displaced so as to extend in the $Z'_S$ direction, the direction $Z'_S$, which now corresponds to the extending direction of the principal axis $Z_S$, is no longer in parallel with the $Z_T$ axis of the coordinate system, in which the first plane surface $P_1$ is set as the reference. On the other hand, when observed from the range image sensor 20, which does not recognize the rotation of the principal axis $Z_S$, it appears as if the first plane surface $P_1$ of the calibration target 30 were rotated around the $Y_T$ axis, so that the $Z_T$ axis were displaced so as to extend in a $Z'_T$ direction.

An angle formed between the $Z_S$ axis and the direction $Z'_S$ is $\theta_P$ in the coordinate system of the range image sensor 20. Similarly, an angle formed between the $Z_T$ axis and the $Z'_T$ direction is $\theta_P$ in the coordinate system of the calibration target 30. In FIG. 4, the rotation between the calibration target 30 and the range image sensor 20 is explained with the case where the range image sensor 20 rotates around the $Y_S$ axis (i.e. a pan angle displacement), however, the above-mentioned state also occurs in a case where the range image sensor 20 rotates around the $X_S$ axis (a tilt angle displacement) or in a case where the range image sensor 20 rotates around the $Z_S$ axis (a roll angle displacement).

Additionally, in this embodiment, a left-hand system is applied to both of the coordinate system $(X_S, Y_S, Z_S)$ of the range image sensor 20 and the coordinate system $(X_T, Y_T, Z_T)$, in which the first plane surface $P_1$ is set as the reference. However, the $Z_S$ axis of the coordinate system $(X_S, Y_S, Z_S)$, in which the range image sensor 20 is set as the reference, and the $Z_T$ axis of the coordinate system $(X_T, Y_T, Z_T)$, in which the first plane surface $P_1$ is set as the reference, are arranged so as to oppose each other. Hence, as is geometrically obvious, it should be noted that, for example, the following differences occur in the rotational directions.

Clockwise rotation around $X_T$ axis: Counterclockwise rotation around Xs axis, and vice versa;

Clockwise rotation $Y_T$ axis: Counterclockwise rotation around $Y_S$ axis, and vice versa;

Clockwise direction around $Z_T$ axis: Counterclockwise rotation around $Z_S$ axis, and vice versa.

Additionally, in the example illustrated in FIG. 4, a direction of a normal vector $Z_N$ of the first plane surface $P_1$ of the calibration target 30 is represented as if the direction of the normal vector $Z_N$ were rotated by $\theta_P$ relative to the direction $Z'_S$ of the principal axis of the range image sensor 20. Hence, the rotation of the range image sensor 20 is extractable from the normal vector $Z_N$ of the first plane surface $P_1$ of the calibration target 30.

Figure 5:
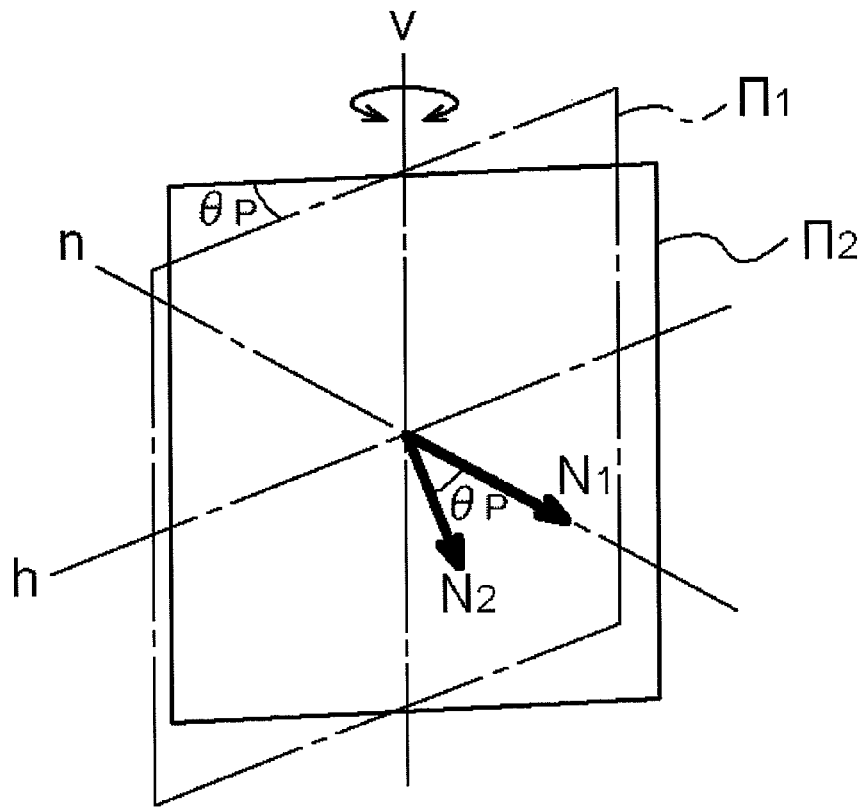
FIG. 5 is a diagram for explaining a rotation of a plane surface with a vertical axis as a rotational axis.
Figure 6:
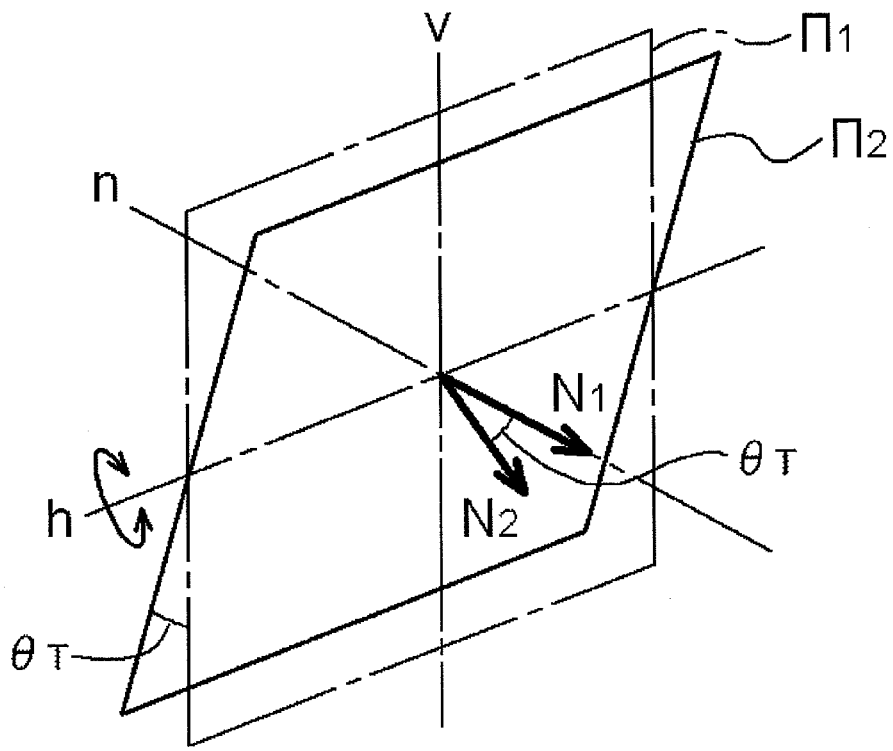
FIG. 6 is a diagram for explaining a rotation of the plane surface with a horizontal axis as the rotational axis.
Figure 7:
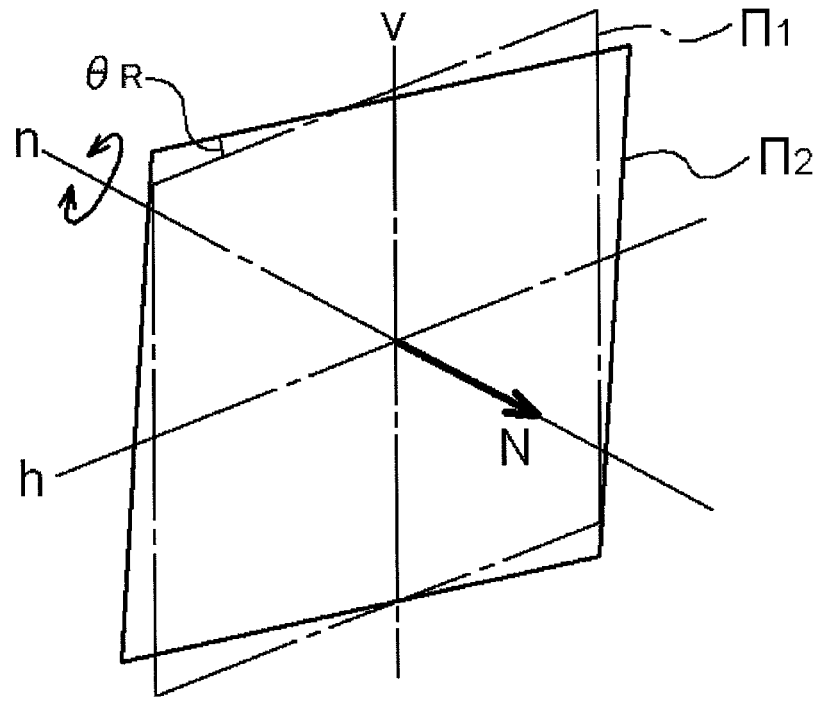
FIG. 7 is a diagram for explaining a rotation of the plane surface with a normal line as the rotational axis.

The rotation of the range image sensor 20 is obtainable by specifying a plane surface of the calibration target 30 and by obtaining the normal vector of the plane surface. However, only two rotational components are extractable from one plane surface. The reason for this will be explained in accordance with FIGS. 5, 6 and 7. A rotation of a plane surface $\Pi_1$ around a vertical axis v as a rotational axis (the pan angle displacement) is illustrated in FIG. 5. A rotation of the plane surface $\Pi_1$ around a horizontal axis h as the rotational axis (the tilt angle displacement) is illustrated in FIG. 6. A rotation of the plane surface $\Pi_1$ around a normal line n as the rotational axis (the roll angle displacement) is illustrated in FIG. 7.

As illustrated in FIG. 5, when the plane surface $\Pi_1$ rotates by the pan angle $\theta_P$ towards a plane surface $\Pi_2$ around the vertical axis v as the rotational axis, a normal vector $N_1$ also rotates towards a normal vector $N_2$ by the pan angle $\theta_P$ in response to the rotation of the plane surface $\Pi_1$. Further, as illustrated in FIG. 6, when the plane surface $\Pi_1$ rotates by a tilt angle $\theta_T$ towards the plane surface $\Pi_2$ around the horizontal axis h as the rotational axis, the normal vector $N_1$ also rotates by the tilt angle $\theta_T$ towards the normal vector $N_2$ in response to the rotation of the plane surface $\Pi_1$. However, as illustrated in FIG. 7, even if the plane surface $\Pi_1$ rotates by a roll angle $\theta_R$ towards the plane surface $\Pi_2$ around a normal line N (n) as the rotational axis, the normal vector N does not change. Accordingly, all of the rotational components in the three-dimensional space are not extractable only by observing one plane surface.

Accordingly, in the embodiment, the calibration target 30 is configured so as to include the first plane surface $P_1$ and the second plane surface $P_2$, which differs from the first plane surface $P_1$. A rotational component, which is not extractable from one of the first and second plane surfaces $P_1$ and $P_2$, is extractable from the other one of the first and second plane surfaces $P_1$ and $P_2$.

Figure 8:
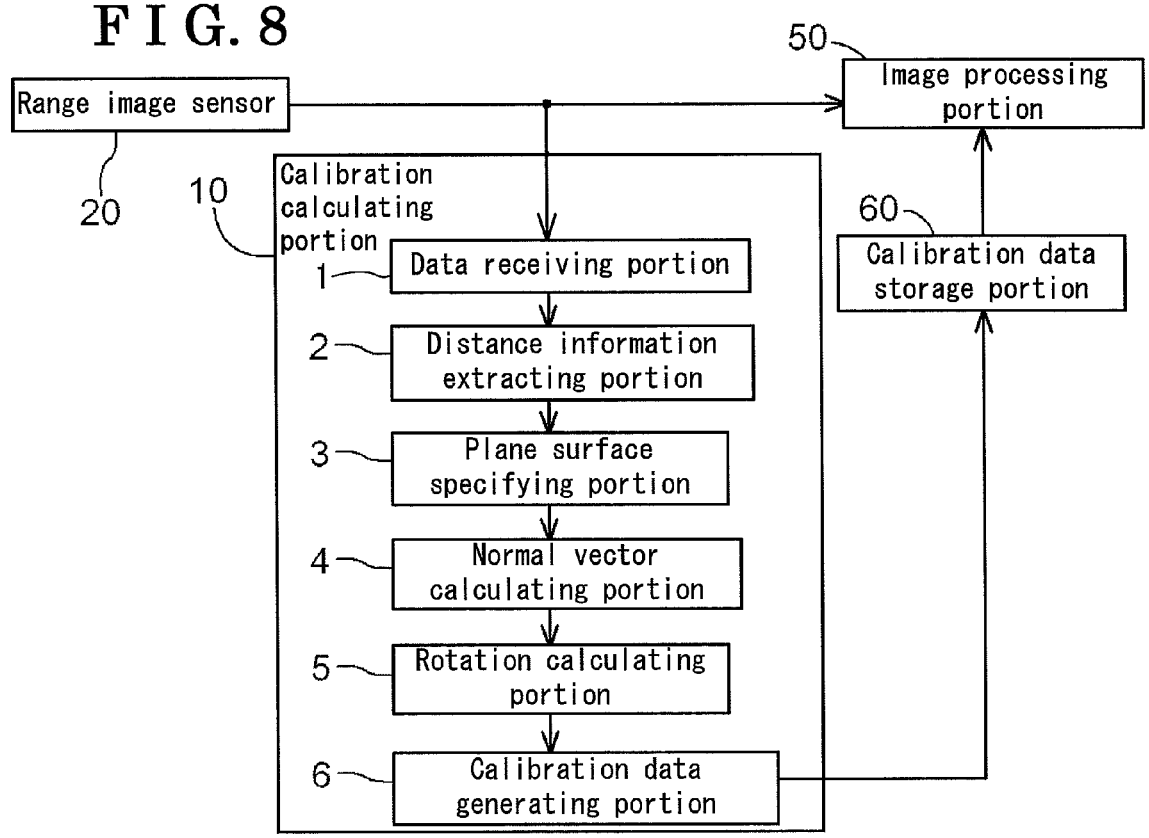
FIG. 8 is a block diagram schematically illustrating a configuration example of a calibration device calibrating the rotation.

More detailed configuration of the calibration device and a procedure of the calibration method, in which the calibration target 30 is used, will be described below. Illustrated in FIG. 8 is a block diagram schematically illustrating a configuration example of the calibration device for the range image sensor 20. The vehicle 40 includes the range image sensor 20, an image processing portion 50 for receiving the range image data from the range image sensor 20 and executing an image processing, and a calibration data storage portion 60 in which a calibration data used for adjusting the range image data is stored. The image processing portion 50 recognizes the surroundings of the vehicle 40 by using the range image data. For example, the image processing portion 50 is provided at the vehicle 40 as a functional portion configuring a parking assistance device, which detects a parking space by recognizing a vehicle parked at a car park. The calibration data stored in the calibration data storage portion 60 is used at the image processing portion 50 in the embodiment illustrated in FIG. 8. However, the present invention is not limited to the above-described configuration, but the calibration device for the range image sensor 20 may be modified so that the calibration data is used at the range image sensor 20 and a calibrated range image data is sent to the image processing portion 50. Alternatively, the calibration device for the range image sensor 20 may be modified so that a calibration portion is separately provided to calibrate the range image data.

The calibration data is generated by a calibration calculating portion 10, which serves as the calibration device. The calibration calculating portion 10 may be provided at the vehicle 40, alternatively, the calibration calculating portion 10 may be set outside of the vehicle 40 within the production plant, the maintenance facility or the like. In the case where the calibration calculating portion 10 is provided at the vehicle 40, the calibration calculating portion 10 may be included in an electric control unit (ECU), which controls the range image sensor 20, a microcomputer configuring the image processing portion 50 or the like. Further, in the case where the calibration calculating portion 10 is set outside of the vehicle 40, an interface, which receives the range image data outputted from the range image sensor 20 and outputs the generated calibration data, is provided between the vehicle 40 and the calibration calculating portion 10.

The calibration calculating portion 10 is configured so as to include a data receiving portion 1 for receiving a calibration-subject data, a plane surface specifying portion 3 for specifying a plane surface in the three-dimensional reference coordinate system, a normal vector calculating portion 4 for calculating the normal vector, and a rotation calculating portion 5 for calculating a rotation (rotational displacement) of the range image sensor 20. In this embodiment, the calibration calculating portion 10 further includes a distance information extracting portion 2 for extracting the distance information of a plane surface to be detected from the calibration-subject data, and a calibration data generating portion 6 for generating the calibration data from the rotation (rotational displacement) of the range image sensor 20.

The data receiving portion 1 is a functional portion for receiving the calibration-subject data, which serves as the range image data including the calibration target 30 being set within the detection range V. When the data receiving portion 1 receives the calibration-subject data, the vehicle 40 is in the stationary state at the predetermined position. The positional information of the calibration target 30, which includes the first plane surface $P_1$ and the second plane surface $P_2$ differing from the first plane surface $P_1$, relative to the vehicle 40 has already been specified in the three-dimensional reference coordinate system $(X_M, Y_M, Z_M)$. Further, the posture information of the calibration target 30 has already been specified in the three-dimensional reference coordinate system $(X_M, Y_M, Z_M)$. The process of the data receiving portion 1 receiving the calibration-subject data, which is the range image data, serves as a data receiving process according to the present embodiment.

The plane surface specifying portion 3 is a functional portion for specifying each of the first and second plane surfaces $P_1$ and $P_2$ in the three-dimensional reference coordinate system $(X_M, Y_M, Z_M)$ on the basis of the calibration-subject data. Firstly, the plane surface specifying portion 3 randomly selects three pixel data (distance data) from the calibration-subject data. As the pixel data is a vector value, the pixel data includes a direction and the distance value. Accordingly, the coordinate value at each point in the three-dimensional reference coordinate system is obtained. Secondly, the plane surface specifying portion 3 substitutes the coordinate value of each point into the following equation of the plane surface (Equation 1) in order to obtain three equations.

$$Ax+By+Cz-D=0 \qquad \text{Equation 1}$$

Thirdly, the plane surface specifying portion 3 solves a simultaneous equation formed by a set of three equations in order to obtain a parameter of each of A, B, C and D, thereby determining a temporary plane surface $P_{TMP}$ of the plane surface P ($P_1$, $P_2$). Fourthly, the plane surface specifying portion 3 determines to what extent each pixel data matches relative to the temporary plane surface $P_{TMP}$, and counts the number of matched pixels. A degree of compatibility (a degree of much) is determined under a condition, for example, where a Euclidean distance from the temporary plane surface $P_{TMP}$ is equal to or lower than a predetermined threshold value. The plane surface specifying portion 3 sequentially and randomly selects three points and specifies the temporary plane surface $P_{TMP}$, at which a count value (i.e. the degree of compatibility) becomes maximum, as the plane surface P. The process of the plane surface specifying portion 3 specifying the plane surface P serves as a plane surface specifying process according to the present embodiment.

The detection range V of the range image sensor 20 is a relatively wide range, in which the calibration target 30 is sufficiently included. Hence, if the calculation of specifying the plane surface as described above is executed against the whole detection range V as the subject of detection, the time necessary for the calculation is extended. Accordingly, in this embodiment, the distance information extracting portion 2 extracts the distance information relating to each of the first plane surface $P_1$ and the second plane surface $P_2$ from the calibration-subject data, and then, the plane surface specifying portion 3 specifies the plane surface P ($P_1$, $P_2$) on the basis of the extracted distance information. The coordinate value of each of the first and second plane surfaces $P_1$ and $P_2$ in the three-dimensional reference coordinate system $(X_M, Y_M, Z_M)$ has already been recognized. As the error of the rotational component is included in the range image sensor 20, it is unlikely that the coordinate value of each of the first and second plane surfaces $P_1$ and $P_2$ is specified in the range image data (calibration-subject data). However, some of the groups of pixels are extractable as the distance information relating to each of the first and second plane surfaces $P_1$ and $P_2$. Accordingly, by the plane surface specifying portion 3 extracting the groups of the pixels to be searched for each subject plane surface in order to specify the plane surface P, a calculation load and a calculation time are prevented from being increased. The extraction of the groups of the pixels is executed in a distance information extracting process executed before the plane surface specifying process.

Additionally, the extraction of the groups of the pixels is executable by the following conditions, except for the above-described set of the coordinate values. For example, conditions such as "groups of pixels having a little difference in a depth direction (depth of vector)", "groups of pixels having a little difference in a left-right direction (pan direction)", "groups of pixels having a little difference in an up-down direction (tilt direction)" and the like are adaptable for the extraction of the groups of the pixels. It should be understood that the condition is appropriately selected depending on the configuration, arrangement and the like of the calibration target 30. Additionally, examples of configurations and arrangements of the calibration target 30 will be given below in accordance with FIGS. 9 to 14.

In the case where, the coordinate systems of the first and second plane surfaces $P_1$ and $P_2$ are arranged so as to be in parallel with or so as to be orthogonal relative to the three-dimensional reference coordinate system as the calibration target 30 of this embodiment, the Euclidean distance does not need to be calculated for the determination of compatibility of the temporary plane surface $P_{TMP}$ by the plane surface specifying portion 3. More specifically, as a distance of each axis is regarded as the Euclidean distance, the calculation load is dramatically decreased. Accordingly, it may be preferable if at least one of plane surfaces included in the calibration target 30 is set to be orthogonal relative to, or in parallel with one axis of the three-dimensional reference coordinate system. Further, it may be preferable if the first and second plane surfaces $P_1$ and $P_2$ are arranged so as to be orthogonal relative to each other, so that both of the first and second plane surfaces $P_1$ and $P_2$ are set to be orthogonal relative to or in parallel with one axis of the three-dimensional reference coordinate system.

When the first and second plane surfaces $P_1$ and $P_2$ are specified by the plane surface specifying portion 3, the normal vector calculating portion 4 calculates the normal vector of each of the first and second plane surfaces $P_1$ and $P_2$ in the three-dimensional reference coordinate system. The normal vector of the plane surface is obtained as follows via Equation 2 (an equation of the plane surface), into which Equation 1 of the plane surface is substituted.

$$f(x,y,z)=Ax+By+Cz-D \qquad \text{Equation 2}$$

The normal vector at a point (x, y, z), in which a function f (x, y, z) in Equation 2 is zero (0), is $\nabla f$. Accordingly, the normal vector is represented by the following equation (Equation 4) on the basis of Equation 3.

$$\frac{\partial f}{\partial x} = A, \frac{\partial f}{\partial y} = B, \frac{\partial f}{\partial z} = C \quad \text{Equation 3}$$

$$\nabla f = \begin{pmatrix} A \\ B \\ C \end{pmatrix} \quad \text{Equation 4}$$

The normal vector calculating portion 4 calculates the normal vector $N_1$ ($[A_1, B_1, C_1]^T$) of the first plane surface $P_1$, and the normal vector $N_2$ ($[A_2, B_2, C_2]^T$) of the second plane surface $P_2$. The process of calculating the normal vector serves as a normal vector calculating process.

As the first plane surface $P_1$ and the second plane surface $P_2$ are plane surfaces, which differ from each other, even if one of the first and the second plane surfaces $P_1$ and $P_2$ rotates around its normal direction as the rotational axis, the rotation (rotational displacement) of one of the first and second plane surfaces $P_1$ and $P_2$ is calculated from the normal vector of the other one of the first and second plane surfaces $P_1$ and $P_2$. The rotation calculating portion 5 calculates the rotation (rotational displacement) of the range image sensor 20 in the three-dimensional reference coordinate system on the basis of the posture information of the calibration target 30, the normal vector $N_1$ and the normal vector $N_2$ in the three-dimensional reference coordinate system. The calibration data generating portion 6 generates the calibration data such as a rotation matrix and the like on the basis of the calculated rotation (rotational displacement). The generated calibration data is stored in the calibration data storage portion 60. The process of calculating the rotation (rotational displacement) of the range image sensor 20 serves as a rotation calculating process. Further, a calibration data generating process for generating the calibration data on the basis of the rotation is executed after the rotation calculating process.

The configuration and arrangement of the calibration target 30 is not limited to the above-descried embodiment. Other examples of configurations and arrangements of the calibration target 30 will be described below in accordance with FIGS. 9 to 14.

Figure 9:
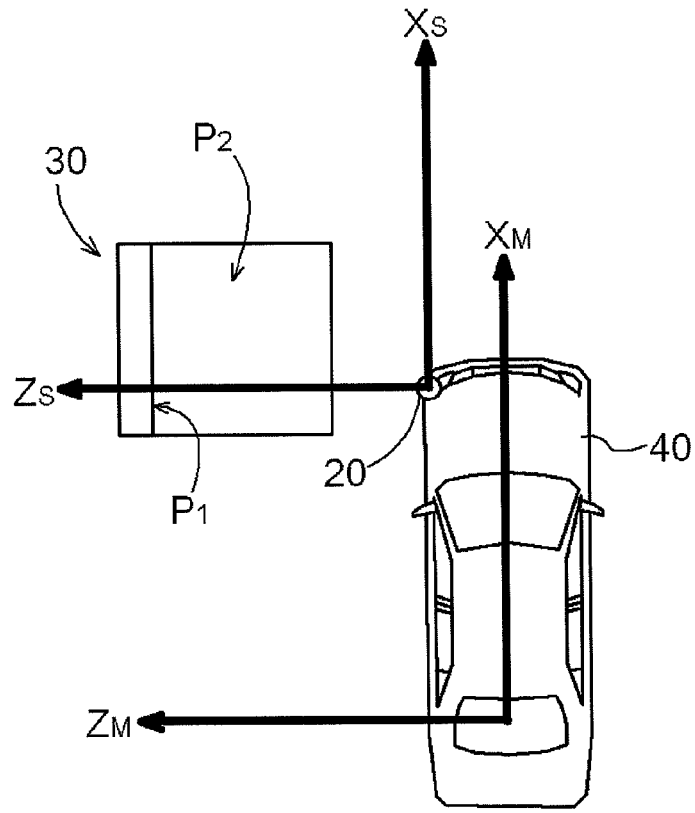
FIG. 9 is a diagram for explaining an arrangement example of the calibration target.
Figure 12:
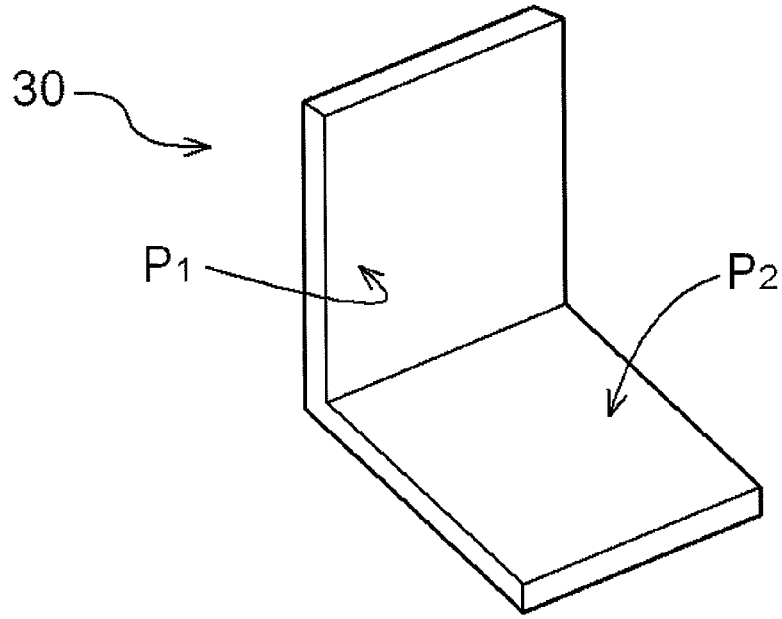
FIG. 12 is a perspective view schematically illustrating another example of the calibration target.
Figure 13:
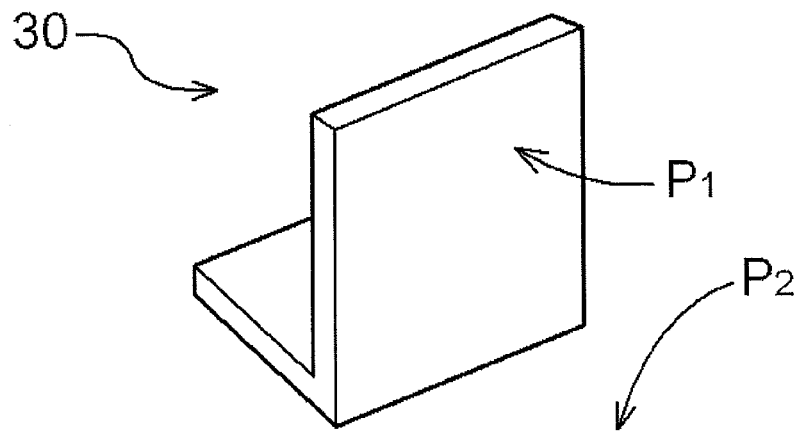
FIG. 13 is a perspective view schematically illustrating a further example of the calibration target.
Figure 14:
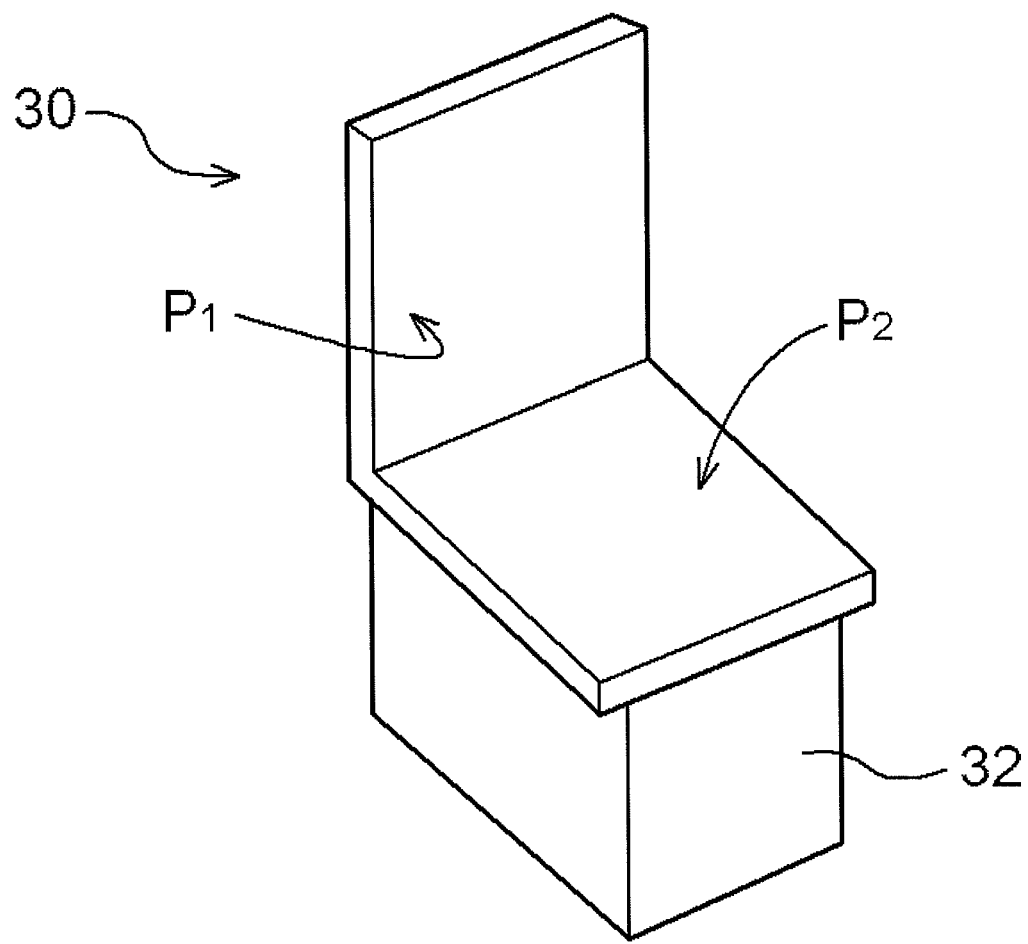
FIG. 14 is a perspective view schematically illustrating a further example of the calibration target.

The arrangement of the calibration target 30 illustrated in FIG. 9 is an example of a case where the second plane surface $P_2$ is set as a horizontal surface. In the case where the arrangement illustrated in FIG. 9 is adapted, configurations illustrated in FIGS. 12 and 13 are adaptable to the calibration target 30. In FIG. 13, a floor surface is set as the second plane surface $P_2$. Accordingly, the calibration target 30 does not necessarily include two plane surfaces, but the calibration target 30 may be appropriately structured by using a wall surface, the floor surface and the like. Illustrated in FIG. 14 is an example where the second plane surface $P_2$ is set as the horizontal surface and the calibration target 30 is upwardly displaced by means of an object 32 in perspective of the detection range V of the range image sensor 20.

Figure 10:
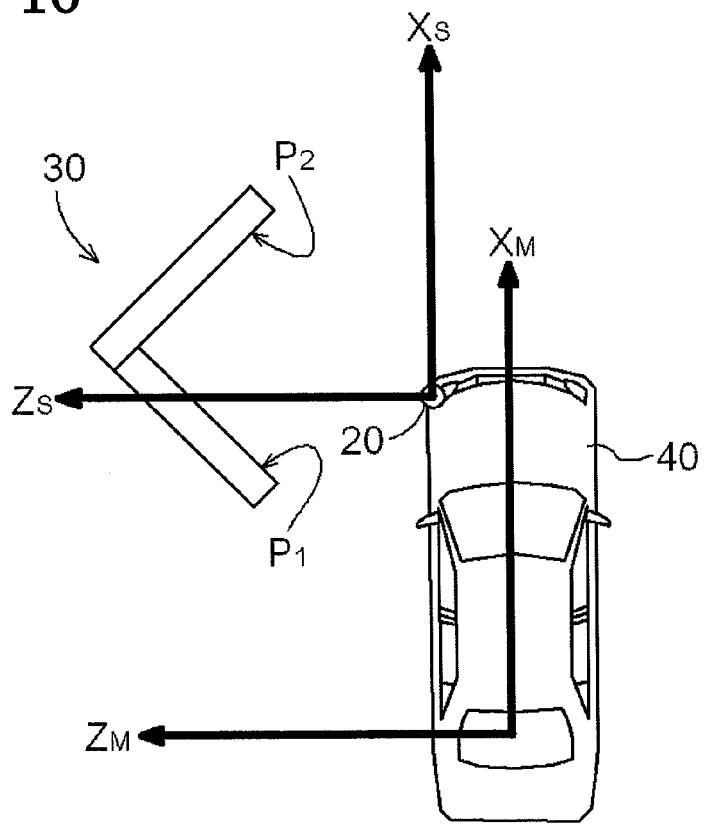
FIG. 10 is a diagram for explaining another arrangement example of the calibration target.
Figure 11:
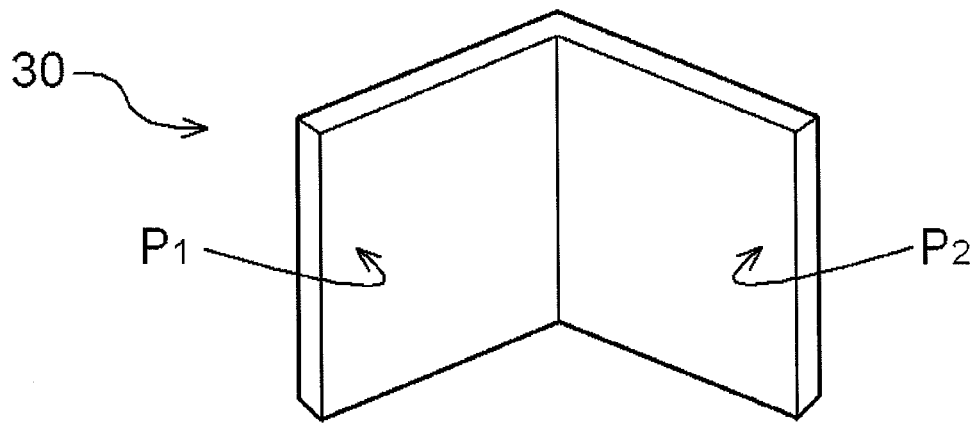
FIG. 11 is a perspective view schematically illustrating an example of the calibration target.

Illustrated in FIG. 10 is an example of a case where the calibration target 30 is arranged so that the plane surface P is not orthogonal relative to and in parallel with the three-dimensional reference coordinate system. In this case, the configuration illustrated in FIG. 11 is adaptable to the calibration target 30. Even if the plane surface P is not arranged so as to be orthogonal relative to and in parallel with the three-dimensional reference coordinate system, the normal vector of each plane surface P is calculated by a displacement from the position where the plane surface P being orthogonal relative to and in parallel with the three-dimensional reference coordinate system as an offset value if the set position and the posture have already been recognized.

It is preferable if the two plane surfaces are arranged in an orthogonal manner as described above. However, as long as those two plane surfaces differ from each other, the two plane surfaces are not necessarily arranged in the orthogonal manner.

Second Embodiment

The attachment error, which may be included in the range image sensor 20, includes the error relating to the position (translation error) and the error relating to the posture (rotational error). As the rotational error has a greater influence relative to the image obtained by the range image sensor 20, comparing to the translation error, the calibration device and the calibration method for calibrating the rotational error is described in detail in the first embodiment. However, it may be preferable that the range image data is adjusted by obtaining the posture and position of the range image sensor 20, i.e. the information relating to the rotation and translation of the coordinate system, in the state where the range image sensor 20 is provided at the vehicle 40. Accordingly, in the second embodiment, a calibration device and a calibration method for calibrating the translation error, in addition to the calibration of the rotational error, will be described. In the second embodiment, obtaining the information relating to the rotation and the translation of the coordinate system is referred to as the calibration of the range image sensor 20. As the calibration of the rotational error is described above, the detailed explanation of the calibration of the rotational error will be omitted, and the detailed explanation of the calibration of the translation error will be described in detail.

A translational movement is defined by a relationship between an origin $O_M$ of the three-dimensional reference coordinate system ($X_M, Y_M, Z_M$) and an origin $O_S$ of the coordinate system ($X_S, Y_S, Z_S$) of the range image sensor 20 in the correlation diagram of the coordinate systems illustrated in FIG. 2. The corresponding points are not limited to the origins, but any desired points may be used to correspond to each other. For example, as a coordinate of a predetermined point of the calibration target 30 has already been recognized, a correspondence between the predetermined point of the calibration target 30 viewed from the coordinate system of the vehicle 40 and the predetermined point of the calibration target 30 viewed from the coordinate system of the range image sensor 20 becomes apparent if it becomes apparent what vector value is included as the pixel data of the range image sensor 20 in the predetermined specified point. However, resolution of the range image sensor 20 may not be high. In this case, if the subject pixel (coordinate) is directly specified on the range image data, the error may be increased.

Figure 15:
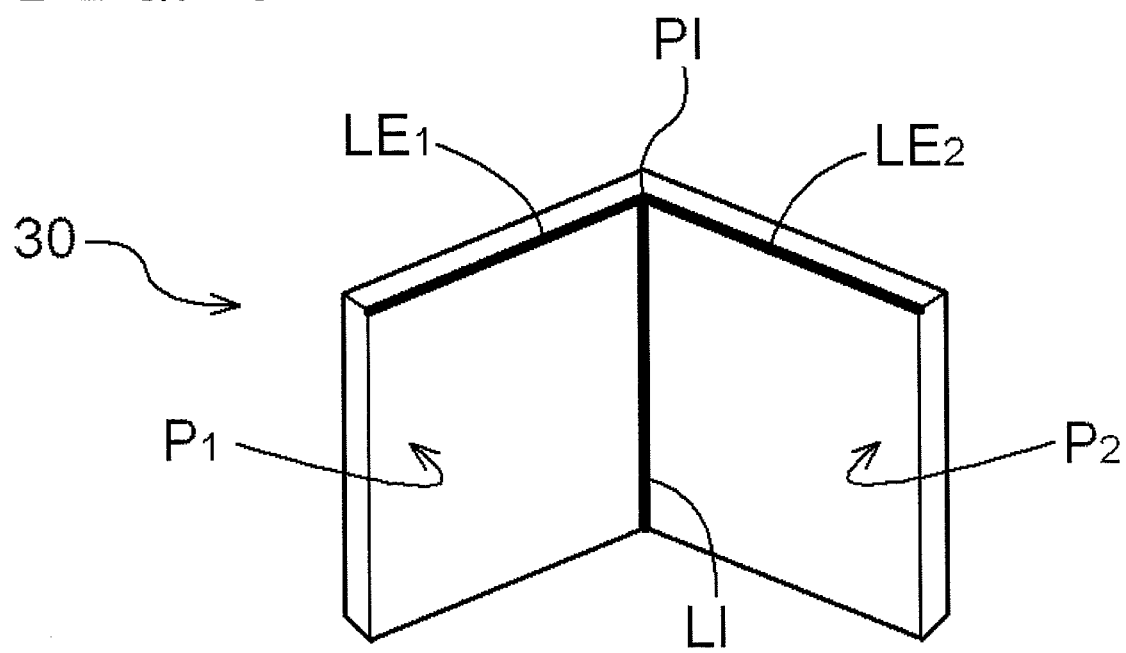
FIG. 15 is a diagram for explaining a principle of detecting a translation by using the calibration target for calibrating the rotation.

A principle of specifying a subject point PI for specifying the translation error by using the calibration target 30, which is used in the first embodiment, will be described below with reference to FIG. 15. The calibration target 30 includes an intersecting portion LI, at which the first and second plane surfaces $P_1$ and $P_2$ intersect with each other. Further, the calibration target 30 is configured so as to include an intersection PI (the subject point PI), at which at least one of first and second plane surface end portions $LE_1$ and $LE_2$ of the respective first and second plane surfaces $P_1$ and $P_2$ intersects with the intersecting portion LI. The intersection PI is specifiable in the three-dimensional reference coordinate system.

Therefore, if the intersection PI is specified on the basis of the range image data, the translation error is calculated.

As described in the first embodiment, the first plane surface $P_1$ and the second plane surface $P_2$ are specifiable. Therefore, an intersection line, at which the first plane surface $P_1$ and the second plane surface $P_2$ intersect with each other, i.e. the intersecting portion LI, is specifiable. Further, if the whole calibration target 30 is included within the detection range V of the range image sensor 20, the first and second plane surface end portions $LE_1$ and $LE_2$ appear as edges in the range image data. Accordingly, the first and second plane surface end portions $LE_1$ and $LE_2$ are specifiable by a known edge detection method such as a Gaussian filter and the like. Then, if at least one of the first plane surface end portion $LE_1$ and the second plane surface end portion $LE_2$, and the intersecting portion LI are specified, the intersection PI is also specified.

In the case where a calculation for edge detection is executed, as described above, it may be preferable that a contrast of the first plane surface end portion $LE_1$ or the second plane surface end portion $LE_2$ is high. As is the case with the first embodiment, it may be preferable if the calibration target 30 is set so as to distance from the wall surface and the like by a predetermined distance in order to accurately specify the surface. Additionally, in the second embodiment, it may be preferable if the calibration target 30 is set so as not to be confused with other objects.

Figure 16:
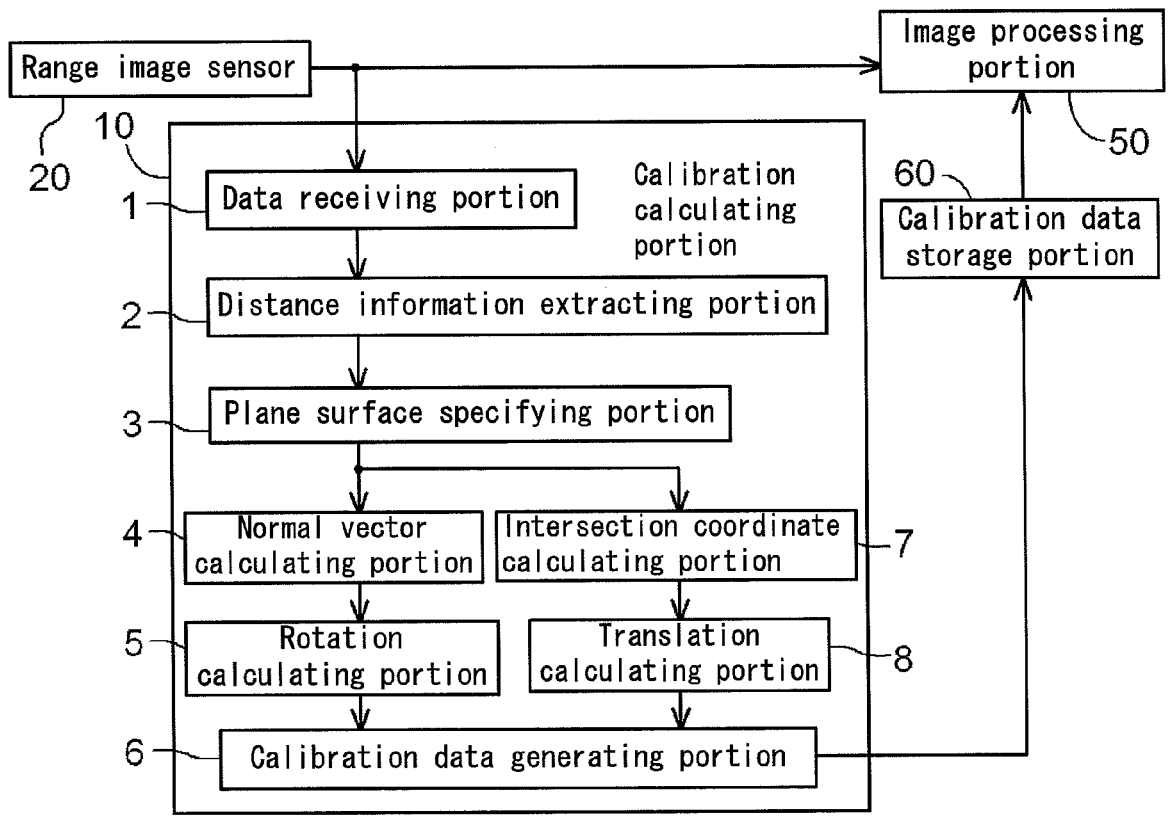
FIG. 16 is a block diagram schematically illustrating a configuration example of the calibration device for calibrating a rotation and the translation.

Illustrated in FIG. 16 is a block diagram schematically illustrating a configuration example of the calibration device, which is capable of calibrating the rotation and the translation, for the range image sensor 20. The configuration of the calibration device for the range image sensor illustrated in FIG. 16 differs from the configuration of the calibration device of the first embodiment illustrated in FIG. 8 in that the calibration calculating portion 10 of the calibration device of the second embodiments further includes an intersection coordinate calculating portion 7 and a translation calculating portion 8. As the functional portions except for the plane surface specifying portion 3 and the calibration data generating portion 6 are the same as the functional portions of the calibration device of the first embodiment, the detailed description will be omitted.

In the second embodiment, it may be preferable not to narrow the range when the distance information relating to each of the first and second plane surfaces $P_1$ and $P_2$ is extracted from the calibration subject data at the distance information extracting portion 2. Pixel data in the vicinity of the first and second plane surface end portions $LE_1$ and $LE_2$ are not always necessary for specifying a plane surface. On the other hand, there may exist a case where the pixel data in the vicinity of the first and second plane surface end portions $LE_1$ and $LE_2$ are not preferably used if the pixel data is possibly distorted. However, in the second embodiment, it may be preferable not to narrow the range for specifying a plane surface at the distance information extracting portion 2 because the first and second plane surface end portions $LE_1$ and $LE_2$ need to be specified.

In addition to the functions described in the first embodiment, the plane surface specifying portion 3 further specifies the first and second plane surface end portions $LE_1$ and $LE_2$, which intersect with the intersecting portion LI. In other words, the plane surface specifying portion 3 specifies the first and second plane surface end portions $LE_1$ and $LE_2$ by using the known edge detection method and the like (the plane surface specifying process).

After the plane surface specifying process, an intersection coordinate specifying process is executed. The intersection coordinate calculating portion 7 is a functional portion for calculating a coordinate of the intersection PI at which the first and second plane surface end portions $LE_1$ and $LE_2$ of the respective first and second plane surfaces $P_1$ and $P_2$, specified by the plane surface specifying portion 3, intersect with each other, in the three-dimensional reference coordinate system. More specifically, the intersection coordinate calculating portion 7 specifies the intersecting portion LI on the basis of the first and second plane surfaces $P_1$ and $P_2$ and calculates the coordinate of the intersection PI, at which the first and second plane surface end portions $LE_1$ and $LE_2$ intersect with the intersecting portion LI.

After the intersection coordinate specifying process, a translation calculating process is executed. The translation calculating portion 8 is a functional portion for calculating a translation (translation displacement) of the range image sensor 20 in the three-dimensional reference coordinate system on the basis of the position information of the calibration target 30 in the three-dimensional reference coordinate system and the coordinate of the intersection PI.

After the translation calculating process and the rotation calculating process, which is simultaneously executed with the translation calculating process or which is executed separately from the translation calculating process in terms of time, the calibration data generating process is executed. The calibration data generating portion 6 generates the calibration data by using the rotation (rotational displacement) calculated by the rotation calculating portion 5, and the translation (translation displacement) calculated by the translation calculating portion 8. The generated calibration data is stored at the calibration data storage portion 60.

Third Embodiment

In the second embodiment, the intersection PI is specified by detecting one of the first and second plane surface end portions $LE_1$ and $LE_2$ of the respective first and second plane surfaces $P_1$ and $P_2$ by means of the edge detection method and the like. However, an error of the edge detection may increase depending on the resolution of the range image sensor 20 or an environment in which the calibration target 30 is set. Hence, in a third embodiment, the calibration device and the calibration method, which more surely calibrate the translation error, will be described.

Figure 17:
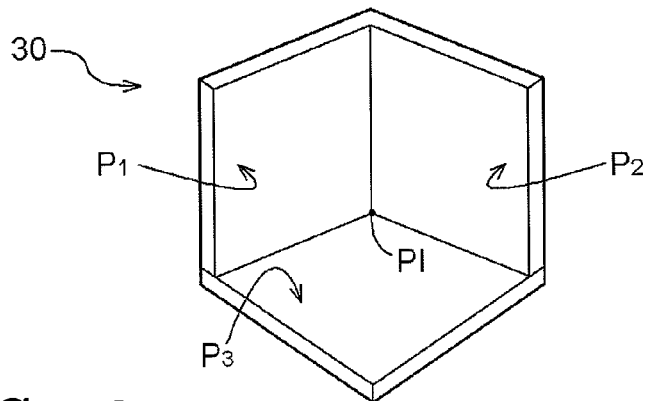
FIG. 17 is a perspective view schematically illustrating an example of the calibration target.

Illustrated in a perspective view of FIG. 17 is an example of the calibration target 30, which is adapted in the third embodiment. As illustrated in FIG. 17, the calibration target 30 further includes a third plane surface $P_3$, which differs from the first and second plane surfaces $P_1$ and $P_2$, and the intersection PI, at which the three plane surfaces $P_1$, $P_2$ and $P_3$ intersect with each other.

The calibration calculating portion 10 in the third embodiment has the same configuration and functions as the calibration calculating portion 10 of the second embodiment illustrated in FIG. 16. The data receiving portion 1 of the third embodiment has the same functions as the data receiving portion 1 of the first and second embodiments. The distance information extracting portion 2 has the same functions as the distance information extracting portion 2 of the first and second embodiments except that the distance information extracting portion 2 further extracts a distance data relating to the third plane surface $P_3$ in addition to the distance data of the first and second plane surfaces $P_1$ and $P_2$. The plane surface specifying portion 3 specifies the third plane surface $P_3$ in the three-dimensional reference coordinate system, in addition to the first and second plane surfaces $P_1$ and $P_2$. The method of specifying a plane surface is the same as one described in the first embodiment. The normal vector calculating portion 4 calculates normal vectors of at least two plane surfaces out of three plane surfaces ($P_1$, $P_2$, $P_3$). The rotation calculating portion 3 calculates the rotation (the rotational displacement) on the basis of at least two normal vectors (the rotation calculating process).

The intersection coordinate calculating portion 7 calculates the coordinate of the intersection PI, at which the first, second and third plane surfaces $P_1$, $P_2$ and $P_3$ specified by the plane surface specifying portion 3 intersect with each other, in the three-dimensional reference coordinate system. This process corresponds to the intersection coordinate calculating process. The translation calculating portion 8 calculates the translation (the translation displacement) of the range image sensor 20 in the three-dimensional reference coordinate system on the basis of the position information of the calibration target 30 in the three-dimensional reference coordinate system and the coordinate of the intersection PI. This process corresponds to the translation calculating process.

After the rotation calculating process and the translation calculating process, the calibration data generating process is executed. The calibration data generating portion 6 generates the calibration data by using the rotation (rotational displacement) calculated by the rotation calculating portion 5 and the translation (translation displacement) calculated by the translation calculating portion 8. The generated calibration data is stored at the calibration data storage portion 60.

Figure 18:
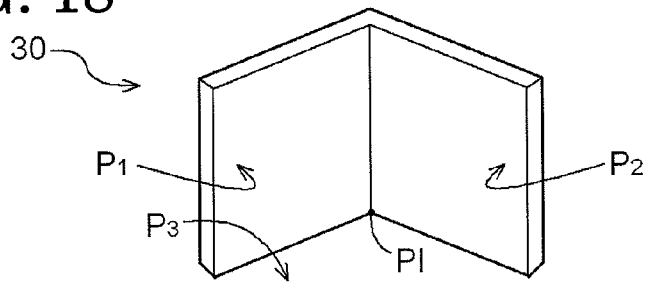
FIG. 18 is a perspective view schematically illustrating another example of the calibration target.

Accordingly, by using the calibration target 30 further having the third plane surface $P_3$, the rotation (rotational displacement) and the translation (translation displacement) are calculated by the similar method. Additionally, the configuration of the calibration target 30 is not limited to the configuration example illustrated in FIG. 17, but a configuration illustrated in FIG. 18 is also adaptable to the calibration target 30. The calibration target 30 illustrated in FIG. 18 utilizes the floor surface as the third plane surface $P_3$. In the case where the calibration target 30 having the configuration illustrated in FIG. 18 is adapted, the configuration used in the first embodiment may be used as the calibration target 30. In the case where the calibration calculating portion 10 is configured with the microcomputer and the like, the calibration device may be upgraded to a device, which is capable of calibrating the translation error (translation displacement) in addition to the rotation error (rotation displacement) without changing a hardware.

As is evident from the first embodiment, as illustrated in FIGS. 17 and 18, it may be preferable if the calibration target 30 is configured so that the first, second and third plane surfaces $P_1$, $P_2$ and $P_3$ are arranged so as to be orthogonal relative to each other. Further, it may be preferable if the calibration target 30 is set so that at least one of the plane surfaces of the calibration target 30 is orthogonal relative to or in parallel with one axis of the three-dimensional reference coordinate system. It may be more preferable if the calibration target 30 is set so that all of the three plane surfaces thereof are orthogonal relative to or in parallel with axes of the three-dimensional reference coordinate system, respectively. However, as is the case with the first embodiment, even if the calculation load increases, the calculation function itself will not be deteriorated as long as the calibration target 30 includes plane surfaces, which differ from each other. Further, as described in the first embodiment with reference to FIGS. 9 to 14, various configurations and postures may be adapted to the calibration target 30 in the third embodiment.

Fourth Embodiment

The calibration device and the calibration method for the active-type range image sensor are described in the above-described embodiments. There exists the passive-type range image sensor, which generates the range image by executing the stereo-image processing to the grayscale image obtained by the CCD, CIS or the like in order to obtain the distance information. In the case where the range image sensor using the grayscale image is adapted, it may be preferable if a pattern is provided to the calibration target 30 in order to facilitate the detection of a characteristic of the calibration target 30.

Accordingly, the calibration device and the calibration method for calibrating the range image sensor 20 in the state where the range image sensor 20 is attached at the vehicle 40 (the mobile body) are achievable by a simple system structure.

According to the embodiments, the calibration calculating portion 10 specifies an approximate position of the calibration target 30 relative to the detection range V and calibrates the range image sensor 20 under the condition where the position information of the calibration target 30, the position information of the vehicle 40, which is in a stationary state at the predetermined position, and the posture information of the calibration target 30 in the three-dimensional reference coordinate system have already been recognized.

Accordingly, the rotations of the plane surface around two axes, which are orthogonal relative to the normal line in the three-dimensional space, as the rotational axis are detectable by specifying one plane surface, except for the rotation of the plane surface around the normal line thereof as the rotational axis. According to the embodiments, the first plane surface $P_1$ and the second plane surface $P_2$, which differs from the first plane surface $P_1$, are specified. As the first and second plane surfaces $P_1$ and $P_2$ differ from each other, normal lines thereof also differ. The rotation of one of the plane surfaces $P_1$ and $P_2$ around the normal line as the rotational axis is not detected on the basis of the one of the first and second plane surfaces $P_1$ and $P_2$. However, the rotation of the one of the plane surfaces around the normal line is detectable on the basis of the other one of the first and second plane surfaces $P_1$ and $P_2$. Accordingly, the rotation of the calibration target 30 around each of three axes, which intersect with each other in a three-dimensional space, is detected. In other words, the rotation (the rotational displacement) of the range image sensor 20 in the three-dimensional reference coordinate system is calculated in the state where the range image sensor 20 is provided at the vehicle 40. The specification of the plane surfaces and the calculation of the normal vectors are executed by the calculating device, such as the CPU and the like, with relatively low calculation load. Accordingly, the calibration device for the range image sensor 20 is achievable with the simple system structure.

According to the embodiments, the calibration calculating portion 10 calibrates the range image sensor 20 in a state where the position information of the calibration target 30, the position information of the vehicle 40, which is in a stationary state at a predetermined position, and the posture information of the calibration target 30 in the three-dimensional reference coordinate system have already been recognized. The calibration calculating portion 10 further includes the distance information extracting portion 2 for extracting the distance information relating to each of the first and second plane surfaces $P_1$ and $P_2$ from the calibration-subject data on the basis of the position information of the calibration target 30, the position information of the vehicle 40 and the posture information of the calibration target 30, so that the plane surface specifying portion 3 specifies each of the first and second plane surfaces $P_1$ and $P_2$ by using the extracted distance information.

Accordingly, the calibration target 30 is set at the predetermined position in the three-dimensional reference coordinate system. Hence, the calibration target 30 is set at a position, at which the calibration target 30 is detectable in the coordinate system of the range image sensor 20 in consideration of the displacement of the range image sensor 20. This means that approximate coordinates, where the range image data of the plane surfaces to be specified exists, has already been recognized. Accordingly, a speed of the calculation for specifying the plane surfaces is increased by eliminating the data not to be detected from the calibration-subject data by preliminarily extracting the distance information relating to the plane surfaces to be specified.

According to the embodiments, the calibration target 30 is configured so as to include the intersecting portion LI, at which the first and second plane surfaces $P_1$ and $P_2$ intersect with each other, and so that an intersection PI, at which at least one of the first and second plane surface end portions $LE_1$ and $LE_2$ of the respective first and second plane surfaces $P_1$ and $P_2$ intersects with the intersecting portion LI, is set at the position, which has already been recognized in the three-dimensional reference coordinate system. The plane surface specifying portion 3 further specifies each of the first and second plane surface end portions $LE_1$ and $LE_2$, which intersect with the intersecting portion LI. Further, the calibration calculating portion 10 further includes the intersection coordinate calculating portion 7 for calculating an intersection coordinate, at which the first and second plane surface end portions $LE_1$ and $LE_2$ of the respective first and second plane surfaces $P_1$ and $P_2$ specified by the plane surface specifying portion 3 intersect with each other, in the three-dimensional reference coordinate system, and a translation calculating portion 8 for calculating a translation of the range image sensor 20 in the three-dimensional reference coordinate system on the basis of a position information of the intersection PI and the intersection coordinate in the three-dimensional reference coordinate system.

A need exists to specify the intersection PI of the calibration target 30 and calculate a displacement of the intersection PI in order to detect the translation displacement of the range image sensor 20 in the three-dimensional reference coordinate system. In the case where the calibration target 30 includes the intersecting portion LI, at which the first plane surface $P_1$ and the second plane surface $P_2$ intersect with each other, the intersecting portion LI is specified by specifying the first and second plane surfaces $P_1$ and $P_2$. Further, by specifying the first and second plane surface end portions $LE_1$ and $LE_2$ of the respective first and second plane surfaces $P_1$ and $P_2$, which intersect with the intersecting portion LI, the intersection PI, at which the first and second plane surfaces $P_1$ and $P_2$ intersect with the intersecting portion PI, is also specified. Accordingly, by setting the intersecting portion PI as a subject, the translation of the range image sensor 20 is detectable.

According to the third embodiment, the calibration target 30 is configured so as to further include the third plane surface $P_3$, which differs from the first and second plane surfaces $P_1$ and $P_2$, and the intersection PI, at which the first, second and third plane surfaces $P_1$, $P_2$ and $P_3$, intersect with each other. The plane surface specifying portion 3 further specifies the third plane surface $P_3$ in the three-dimensional reference coordinate system. Further, the calibration calculating portion 10 further includes the intersection coordinate calculating portion 7 for calculating an intersection coordinate, at which the first, second and third plane surfaces $P_1$, $P_2$ and $P_3$, specified at the plane surface specifying portion 3, intersect with each other, in the three-dimensional reference coordinate system, and the translation calculating portion 8 for calculating the translation of the range image sensor 20 in the three-dimensional reference coordinate system on the basis of a position information of the intersection PI and the intersection coordinate in the three-dimensional reference coordinate system.

Accordingly, in order to detect the translation displacement of the range image sensor 20 in the three-dimensional reference coordinate system, the intersection PI of the calibration target 30 needs to be specified and the displacement of the intersection PI needs to be calculated. In the case where the calibration target 30 is configured to include three difference plane surfaces $P_1$, $P_2$ and $P_3$ and the three plane surfaces $P_1$, $P_2$ and $P_3$ are specified, the intersection PI, at which the three plane surfaces $P_1$, $P_2$ and $P_3$ intersect with each other, is specified. In order to specify the plane surface end portions $LE_1$ and $LE_2$ of the calibration target 30, it may be preferable if the resolution of the range image sensor 20 is high. However, in the case where the calibration target 30 having three plane surfaces $P_1$, $P_2$ and $P_3$ is adapted, the plane surface end portions do not need to be specified, but the intersection PI is specified by specifying the three plane surfaces $P_1$, $P_2$ and $P_3$. Accordingly, the high resolution is not required to the range image sensor 20. Hence, the calibration target 30 is adaptable to the calibration of various range image sensors.

According to the embodiments, the calibration calculating portion 10 further includes the distance information extracting portion 2 for extracting the distance information relating to each of the first, second and third plane surfaces $P_1$, $P_2$ and $P_3$, wherein the plane surface specifying portion 3 specifies each of the first, second, and third plane surfaces $P_1$, $P_2$ and $P_3$ by using the extracted distance information.

Accordingly, the calibration target 30 is set at the predetermined position in the three-dimensional reference coordinate system. Hence, the calibration target 30 is set at the position predictable in the coordinate system of the range image sensor 20 in perspective of the displacement of the range image sensor 20. Accordingly, the speed of the calculation for specifying the plane surfaces is increased by eliminating the data not to be detected from the calibration-subject data by preliminarily extracting the distance information relating to the plane surfaces to be specified.

According to the embodiments, the first and second plane surfaces $P_1$ and $P_2$ are surfaces, which are orthogonal to each other.

According to the third embodiment, the first, second and third plane surfaces $P_1$, $P_2$ and $P_3$ are surfaces, which are orthogonal to each other.

As the Cartesian coordinate system is adapted to the three-dimensional reference coordinate system, the calculation for specifying the plane surfaces is simplified if the plane surfaces to be specified are arrange in the orthogonal manner.

According to the embodiments, the calibration target 30 is set in a state where at least one of the first and the second plane surfaces $P_1$ and $P_2$ of the calibration target 30 is orthogonal relative to or in parallel with one axis of the three-dimensional reference coordinate system.

Accordingly, the calculation for specifying the plane surfaces is facilitated if the plane surface is set so as to be orthogonal relative to or in parallel with one axis of the three-dimensional reference coordinate system. Specifically, in the case where the plane surface is arranged so as to be in parallel with one axis of the three-dimensional reference coordinate, a calculation for one axis is eliminable, thereby further decreasing the calculation load.

The rotations of the plane surface around two axes, which are orthogonal to the normal line in the three-dimensional space, as the rotational axes, are detectable by specifying one plane surface, except for the rotation of the plane surface around the normal line thereof as the rotational axis. According to the calibration method, the first plane surface $P_1$ and the second plane surface $P_2$, which differs from the first plane surface P1, are detected. As the calibration target 30 includes different plane surfaces $P_1$ and $P_2$, the calibration target 30 also includes different normal lines. The rotation of one of the first and second plane surface $P_1$ and $P_2$ around the normal line as the rotational axis is not detectable on the basis of the one of the first and the second plane surfaces $P_1$ and $P_2$. However, the rotation of the one of the first and second plane surfaces $P_1$ and $P_2$ around the normal line as the rotational axis is detectable on the basis of the other one of the first and second plane surfaces $P_1$ and $P_2$. Accordingly, the rotation of the plane surface around each of the three axes in the three-dimensional space is detectable. In other words, the rotation (the rotational displacement) of the range image sensor 20 in the three-dimensional reference coordinate system is detected in the state where the range image sensor 20 is provided at the vehicle 40. The calibration method for the range image sensor 20 relating to the embodiments includes all of additional features and its effects and advantages in addition to the effects and advantages of the calibration device for the range image sensor 20.

According to the embodiments, the calibration target 30 further includes the third plane surface $P_3$, which differs from the first and second plane surfaces $P_1$ and $P_2$, the plane surface specifying process further specifies the third plane surface $P_3$ in the three-dimensional reference coordinate system. The calibration method further includes the intersection coordinate calculating process for calculating an intersection coordinate, at which the first, second and third plane surfaces $P_1$, $P_2$ and $P_3$ specified by the plane surface specifying process intersect with each other, in the three-dimensional coordinate system, and the translation calculating portion for calculating a translation of the range image sensor 20 in the three-dimensional coordinate system on the basis of the position information and the intersection coordinate in the three-dimensional reference coordinate system.

In order to detect the translation displacement of the range image sensor 20 in the three-dimensional reference coordinate system, the intersection PI of the calibration target 30 needs to be specified and the displacement of the intersection PI needs to be calculated. In the case where the calibration target 30 is configured to include three different plane surfaces $P_1$, $P_2$ and $P_3$ and where those three plane surfaces $P_1$, $P_2$ and $P_3$ are specified, the intersection PI, at which the specified three plane surfaces $P_1$, $P_2$ and $P_3$ intersect with each other, is specified. Accordingly, by setting the intersection PI as the subject, the translation of the range image sensor 20 is detectable. Additionally, the calibration method of the range image sensor 20 relating to the embodiments includes all of additional features and its effects and advantages in addition to the effects and advantages of the calibration device for the range image sensor 20.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A calibration device for a range image sensor which is attached at a mobile body, the calibration device being configured so as to calibrate an attachment error to the mobile body of the range image sensor, which is attached at a mobile detects a distance of each direction within a detection range and generates a range image data from the detected distance information, in a state where the range image sensor is attached at the mobile body, the calibration device comprising:

a data receiving portion for receiving a calibration-subject data, which is the range image data including a calibration target, from the range image sensor, the calibration target being set within the detection range and is configured so as to include a first plane surface and a second plane surface, which differs from the first plane surface;

a plane surface specifying portion for specifying each of the first plane surface and the second plane surface in a three-dimensional reference coordinate system on the basis of the calibration-subject data;

a normal vector calculating portion for calculating a normal vector of each of the specified first and second plane surfaces in the three-dimensional reference coordinate system; and a rotation calculating portion for calculating a rotation of the range image sensor caused by the attachment error to the mobile body in the three-dimensional reference coordinate system on the basis of a posture information of the calibrated target, which has already been recognized, and the normal vector in the three-dimensional coordinate system.

2. The calibration device for the range image sensor according to claim 1, wherein the calibration device specifies an approximate position of the calibration target relative to the detection range and calibrates the range image sensor under a condition where a position information of the calibration target, a position information of the mobile body, which is in a stationary state at a predetermined position, and the posture information of the calibration target in the three-dimensional reference coordinate system have already been recognized.

3. The calibration device for the range image sensor according to claim 1, wherein the calibration device calibrates the range image sensor in a state where a position information of the calibration target, a position information of the mobile body, which is in a stationary state at a predetermined position, and the posture information of the calibration target in the three-dimensional reference coordinate system have already been recognized, and wherein the calibration device further includes a distance information extracting portion for extracting the distance information relating to each of the first and second plane surfaces from the calibration-subject data on the basis of the position information of the calibration target, the position information of the mobile body and the posture information of the calibration target, so that the plane surface specifying portion specifies each of the first and second plane surfaces by using the extracted distance information.

4. The calibration device for the range image sensor according to claim 1, wherein the calibration target is configured so as to include an intersecting portion, at which the first and second plane surfaces intersect with each other, and so that an intersection, at which at least one of first and second plane surface end portions of the respective first and second plane surfaces intersects with the intersecting portion, is set at the position, which has already been recognized in the three-dimensional reference coordinate system, the plane surface specifying portion further specifies each of the first and second plane surface end portions, which intersect with the intersecting portion, and wherein the calibration device further includes an intersection coordinate calculating portion for calculating an intersection coordinate, at which the first and second plane surface end portions of the respective first and second plane surfaces specified by the plane surface specifying portion intersect with each other, in the three-dimensional reference coordinate system, and a translation calculating portion for calculating a translation of the range image sensor in the three-dimensional reference coordinate system on the basis of a position information of the intersection and the intersection coordinate in the three-dimensional reference coordinate system.

5. The calibration device for the range image sensor according to claim 1, wherein the calibration target is configured so as to further include a third plane surface, which differs from the first and second plane surfaces, and an intersection, at which the first, second and third plane surfaces, intersect with each other, the plane surface specifying portion further specifies the third plane surface in the three-dimensional reference coordinate system, and wherein the calibration device further includes an intersection coordinate calculating portion for calculating an intersection coordinate, at which the first, second and third plane surfaces, specified at the plane surface specifying portion, intersect with each other, in the three-dimensional reference coordinate system, and a translation calculating portion for calculating a translation of the range image sensor in the three-dimensional reference coordinate system on the basis of a position information of the intersection and the intersection coordinate in the three-dimensional reference coordinate system.

6. The calibration device for the range image sensor according to claim 5 further including a distance information extracting portion for extracting the distance information relating to each of the first, second and third plane surfaces, wherein the plane surface specifying portion specifies each of the first, second, and third plane surfaces by using the extracted distance information.

7. The calibration device for the range image sensor according to claim 1, wherein the first and second plane surfaces are surfaces, which are orthogonal to each other.

8. The calibration device for the range image sensor according to claim 5, wherein the first, second and third plane surfaces are surfaces, which are orthogonal to each other.

9. The calibration device for the range image sensor according to claim 1, wherein the calibration target is set in a state where at least one of the first and the second plane surfaces of the calibration target is orthogonal relative to or in parallel with one axis of the three-dimensional reference coordinate system.

10. A calibration method for a range image sensor which is attached at a mobile body, the calibration method calibrating an attachment error to the mobile body of the range image sensor, which detects a distance of each direction within a detection range and generates a range image data from the detected distance information, in a state where the range image sensor is attached at the mobile body, the calibration method comprising;
 a mobile body setting process for setting the mobile body at a predetermined position in a three-dimensional reference coordinate system in a stationary state:
 a calibration target setting process for setting a calibration target within the detection range in a state where a position information of the calibration target relative to the mobile body and a posture information of the calibration target is specified in the three-dimensional reference coordinate system, the calibration target being configured so as to include a first plane surface and a second plane surface, which differs from the first plane surface;
 a data receiving process for receiving a calibration-subject data from the range image sensor, the calibration-subject data being a range image data generated by the range image sensor in a state where the mobile body is in the stationary state at the predetermined position and including the calibration target;
 a plane surface specifying process for specifying each of the first and second plane surfaces in the three-dimensional reference coordinate system on the basis of the calibration-subject data;
 a normal vector calculating process for calculating a normal vector of each of the specified first and second plane surfaces in the three-dimensional reference coordinate system; and
 a rotation calculating process for calculating a rotation of the range image sensor caused by the attachment error to the mobile body in the three-dimensional reference coordinate system on the basis of the posture information of the calibrated target of the calibration target and the normal vector of each of the specified first and second plane surfaces in the three-dimensional reference coordinate system.

11. The calibration method for the range image sensor according to claim 10, wherein the calibration target further includes a third plane surface, which differs from the first and second plane surfaces, the plane surface specifying process further specifies the third plane surface in the three-dimensional reference coordinate system, and wherein the calibration method further includes an intersection coordinate calculating process for calculating an intersection coordinate, at which the first, second and third plane surfaces specified by the plane surface specifying process intersect with each other, in the three-dimensional coordinate system, and a translation calculating portion for calculating a translation of the range image sensor in the three-dimensional coordinate system on the basis of the position information and the intersection coordinate in the three-dimensional reference coordinate system.

\* \* \* \* \*